(12) United States Patent
Böker

(10) Patent No.: US 11,084,133 B2
(45) Date of Patent: Aug. 10, 2021

(54) METHOD FOR PRODUCING A CLUTCH PACK FORMED BY CLUTCH PLATES ARRANGED ON TOP OF ONE ANOTHER, AND DEVICE FOR CARRYING OUT A METHOD OF THIS TYPE

(71) Applicant: Kienle + Spiess GmbH, Sachsenheim (DE)

(72) Inventor: Björn Böker, Esslingen (DE)

(73) Assignee: Kienle + Spiess GmbH, Sachsenheim (DE)

( * ) Notice: Subject to any disclaimer, the term of this patent is extended or adjusted under 35 U.S.C. 154(b) by 0 days.

(21) Appl. No.: 15/780,075

(22) PCT Filed: Nov. 30, 2016

(86) PCT No.: PCT/EP2016/002019
§ 371 (c)(1),
(2) Date: May 30, 2018

(87) PCT Pub. No.: WO2017/092866
PCT Pub. Date: Jun. 8, 2017

(65) Prior Publication Data
US 2018/0345427 A1    Dec. 6, 2018

(30) Foreign Application Priority Data

Dec. 1, 2015    (DE) .................... 10 2015 015 762.0

(51) Int. Cl.
| | | |
|---|---|---|
| *B23P 23/00* | (2006.01) | |
| *B23K 20/12* | (2006.01) | |
| *B21D 28/22* | (2006.01) | |
| *B23K 20/233* | (2006.01) | |
| *B23K 20/24* | (2006.01) | |
| *B23K 28/02* | (2014.01) | |
| *B23P 15/00* | (2006.01) | |
| *H02K 15/02* | (2006.01) | |

(Continued)

(52) U.S. Cl.
CPC .............. *B23P 23/00* (2013.01); *B21D 28/22* (2013.01); *B23K 20/129* (2013.01);
(Continued)

(58) Field of Classification Search
CPC ....... B23P 23/00; B23P 15/00; B23P 2700/12; B23K 20/26; B23K 28/02; B23K 20/24;
(Continued)

(56) References Cited

U.S. PATENT DOCUMENTS

| 3,866,014 A | 2/1975 | Walter |
| 4,002,283 A | 1/1977 | Nonoyama |

(Continued)

FOREIGN PATENT DOCUMENTS

| DE | 25 28 364 | 1/1976 |
| DE | 100 40 978 | 3/2002 |

(Continued)

*Primary Examiner* — Jason L Vaughan
(74) *Attorney, Agent, or Firm* — Gudrun E. Huckett

(57) ABSTRACT

In order to produce a clutch pack (3), clutch plates are cut from an electrical steel strip or sheet, arranged on top of one another to form the clutch pack (3) and connected to one another within the clutch pack (3). The material of the clutch plates is locally plasticised in the edge region via the generation of frictional heat by means of at least one tool (9'), in such a way that the material of at least adjacent clutch plates is mixed with the tool (9') such that, after the plasticised material has cooled, these clutch plates are integrally connected to one another. The device used for this purpose has at least one punch press and/or at least one receiving means for one or more clutch packs (3). In addition, the device has at least one welding tool that is rotatably driven about its axis and can be moved in a transverse direction to its rotational axis.

8 Claims, 3 Drawing Sheets

(51) Int. Cl.
  *H01F 41/02* (2006.01)
  *B23K 20/26* (2006.01)
  *B23K 101/18* (2006.01)
  *B23K 103/10* (2006.01)
(52) U.S. Cl.
  CPC ...... *B23K 20/1265* (2013.01); *B23K 20/2336* (2013.01); *B23K 20/24* (2013.01); *B23K 20/26* (2013.01); *B23K 28/02* (2013.01); *B23P 15/00* (2013.01); *H01F 41/0233* (2013.01); *H02K 15/02* (2013.01); *B23K 2101/18* (2018.08); *B23K 2103/10* (2018.08); *B23P 2700/12* (2013.01)
(58) Field of Classification Search
  CPC ............ B23K 20/2336; B23K 20/1265; B23K 20/129; B23K 2103/10; B23K 2101/18; B23K 20/1255; B23K 20/125; H01F 41/0233; H02K 15/02; B21D 28/22
  See application file for complete search history.

(56) References Cited

U.S. PATENT DOCUMENTS

| | | | | |
|---|---|---|---|---|
| 5,171,962 A | * | 12/1992 | Sakanishi | B23K 26/067 219/121.64 |
| 5,695,591 A | | 12/1997 | Hamada et al. | |
| 5,697,544 A | * | 12/1997 | Wykes | B23K 20/125 156/580 |
| 6,247,633 B1 | * | 6/2001 | White | B23K 20/123 228/112.1 |
| 7,575,148 B2 | * | 8/2009 | Kubouchi | H01G 9/0029 228/112.1 |
| 7,703,656 B2 | * | 4/2010 | Park | B23K 20/1255 228/2.1 |
| 8,028,888 B2 | * | 10/2011 | Kumagai | B23K 20/122 228/112.1 |
| 9,999,940 B2 | * | 6/2018 | Mialhe | B23K 20/1255 |
| 10,093,075 B2 | * | 10/2018 | Mochizuki | B32B 15/20 |
| 2015/0183053 A1 | | 7/2015 | Kumagai et al. | |

FOREIGN PATENT DOCUMENTS

| | | | |
|---|---|---|---|
| DE | 10 2006 000 277 | | 12/2006 |
| EP | 0 446 714 | | 9/1991 |
| GB | 888 770 | | 2/1962 |
| GB | 1 079 773 | | 8/1967 |
| JP | 2006320924 | | 11/2006 |
| JP | 2008182848 | | 8/2008 |
| JP | 2010110155 | | 5/2010 |
| JP | 2010110155 A | * | 5/2010 |
| JP | 2015123488 | | 7/2015 |
| WO | 2015/082076 | | 6/2015 |

* cited by examiner

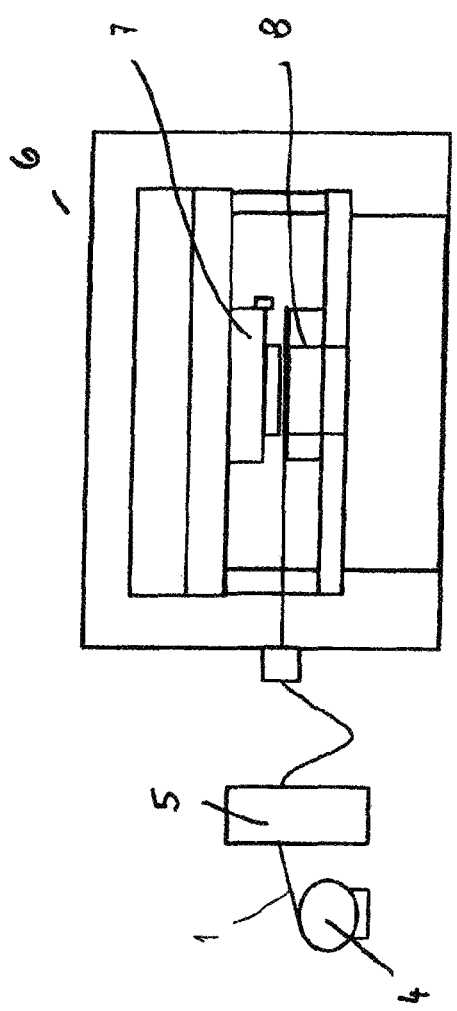
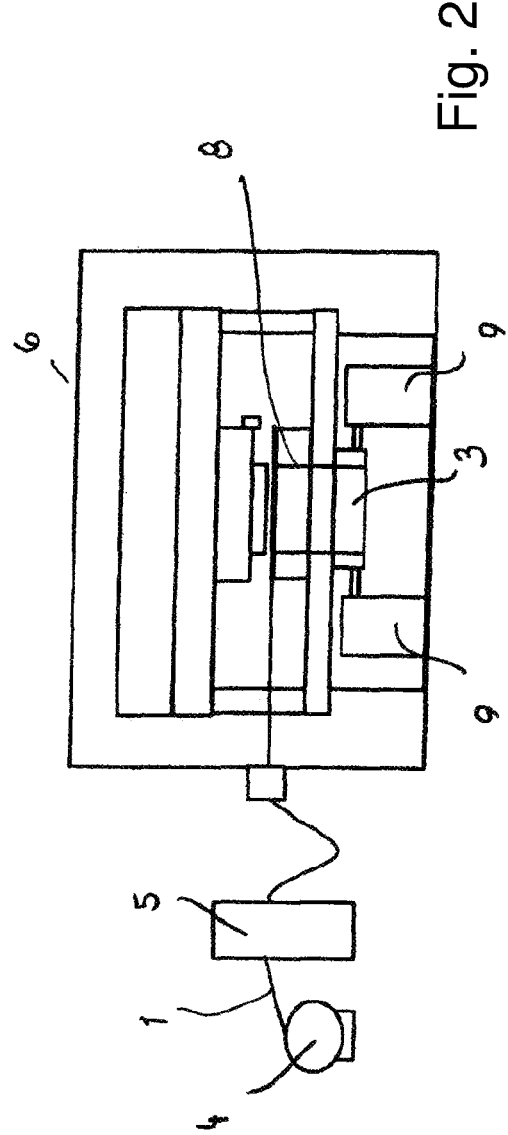

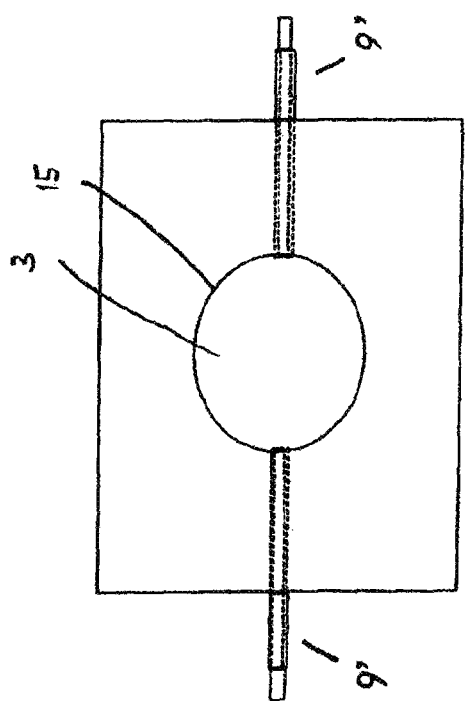
Fig. 5
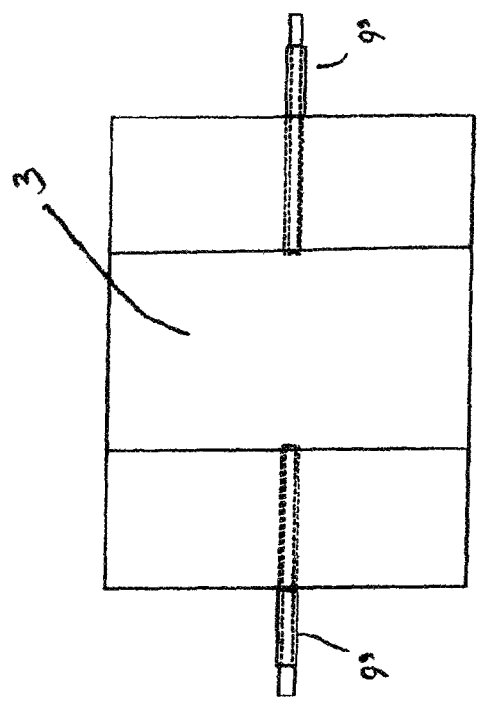
Fig. 6
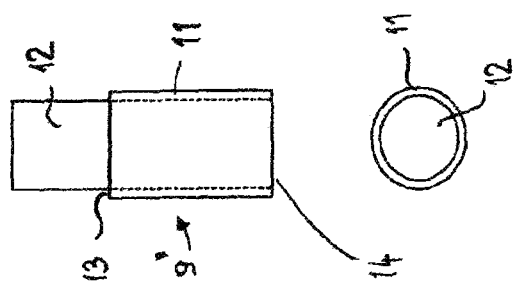
Fig. 3
Fig. 4

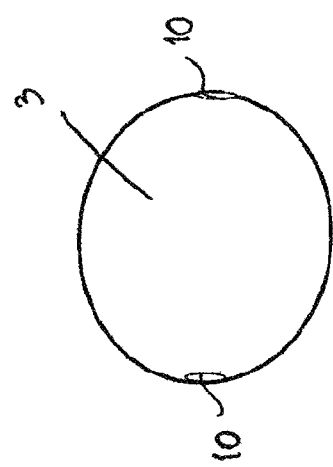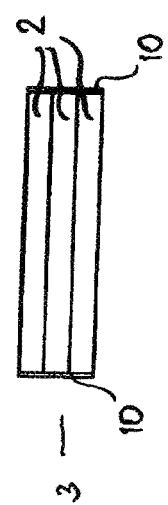

METHOD FOR PRODUCING A CLUTCH PACK FORMED BY CLUTCH PLATES ARRANGED ON TOP OF ONE ANOTHER, AND DEVICE FOR CARRYING OUT A METHOD OF THIS TYPE

BACKGROUND OF THE INVENTION

The invention concerns a method for producing a lamination pack comprised of laminations lying on top of each other, in which the laminations are cut from an electric strip or sheet, placed on top of each other to the lamination pack, and connected to each other within the lamination pack, and a device for carrying out such a method with at least one punch press and/or at least one receptacle for one or a plurality of lamination packs.

It is known to cut laminations from an electric sheet and to place them on top of each other for forming a lamination pack. Subsequently, the laminations lying on top of each other are connected with form fit to each other. For this purpose, the laminations are provided with at least one projection with which the laminations engage corresponding recesses of the respective neighboring lamination. The production of such laminations is complex. Also, it may occur that this form-fit connection becomes detached, for example, during transport or during storage of the lamination pack.

It is furthermore known to fixedly connect the laminations within the lamination pack by screws or rivets which are penetrating this lamination pack. This process is also complex. Moreover, in particular when taller lamination packs are to be formed, the laminations must be rotated respectively by a certain angular amount prior to placement in order to ensure that the lamination pack has a constant height about its circumference.

Therefore, methods are known also in which laminations lying on top of each other are glued to each other.

In a further known method, the laminations lying on top of each other are welded to each other. This welding method however has limitations. For the use of the lamination pack in rotors and/or stators of electric motors or generators, metal strips are frequently employed which are comprised of silicon and aluminum. In case of silicon proportions of more than approximately 3% by weight or silicon and aluminum proportions of more than 4% by weight, such laminations can be welded only with great difficulty. A high silicon contents is however desirable because magnetic losses can be reduced and therefore greater efficiencies can be obtained therewith. Moreover, laminations that are coated with an EC3 insulation varnish are difficult to weld. Also, large and/or also deep heat zones are produced. The gaps between the sheet metals must be precisely adjusted in order to obtain a good welding result.

The invention has the object to configure the method of the aforementioned kind and the device of the aforementioned kind in such a way that the laminations, independent of the starting material and the stack density, can be connected to each other reliably within the lamination pack.

SUMMARY OF THE INVENTION

This object is solved for the method of the aforementioned kind in accordance with the invention in that the material of the laminations is locally plasticized in the edge region by generating friction heat by means of at least one tool such that the material, at least of neighboring laminations, is mixed by means of the tool so that, after cooling of the plasticized material, these laminations are connected to each other by material fusion For the device of the aforementioned kind this object is solved in accordance with the invention in that the device comprises at least one welding tool that is rotatably driven about its axis and movable transverse to its axis of rotation.

With the method according to the invention, the laminations can be fixedly connected to each other in a simple, cost-saving way, independent of the material composition of the laminations. With the tool, the material of the laminations is locally plasticized at the edge region in that the lamination is heated locally by means of the tool so strongly that the lamination material becomes plasticized. Then, this plasticized material can be mixed between neighboring laminations by means of the tool. This has the result that, after cooling of the plasticized material, the laminations are fixedly connected to each other with material fusion. The tool itself is selected such that it does not become soft or plasticized in this process. When the laminations are produced from silicon-aluminum strips, the silicon proportion can be so high that the magnetic losses are minimal.

A simple and reliable connection of the laminations within the lamination pack results in an advantageous way when the tool is moved across the height of the lamination pack and, in doing so, is forced with such a great force against the lamination pack that the material of the laminations in the contact region with the tool becomes plasticized. The tool can be adjusted in regard to the width of the weld seam that is being formed at the circumference of the lamination pack. When this weld seam is supposed to have only a very minimal width, a correspondingly narrow tool is employed. By means of the height and/or the duration of the pressing force, it can be determined how deep the material of the laminations is plasticized when performing the method.

The tool is advantageously rotatably driven about its axis during one the advancing movement. By rotating the tool, the plasticized material of neighboring laminations is mixed with each other in a simple way.

In a further simple embodiment, the tool is moved in axial direction along the lamination pack. In this way, a weld seam extending in axial direction is also produced at the lamination pack.

Depending on the configuration of the lamination pack, the tool can however be moved also at an angle at a slant across the height of the lamination pack so that the resulting weld seam is no longer axially extending but has a slope.

In another method, the tool is stationary and is driven in rotation about its axis. In this case, the lamination pack is moved in its height direction relative to the stationary tool and, in doing so, is forced by such a great force against the tool that the material of the laminations is plasticized in the contact region. In this case, the tool can also be adjusted with regard to the width of the weld seam forming at the circumference of the lamination pack.

It is also possible to move the tool or the lamination pack in different directions across the height of the lamination pack. In this way, it is possible to adjust the position and/or the course of the weld seam to the respective specifications. The advancing movement of the tool can be programmed in a very simple way by means of a control unit.

A simple and time-saving method results when the lamination pack is processed with two or more tools.

In this context, the tools work advantageously simultaneously at the lamination pack so that about the circumference of the lamination pack the required weld seams are applied in the desired way.

Preferably, the tools can be driven independent of each other. In this way there is the possibility of controlling the individual tools in a targeted fashion and to impart to them, for example, different advancing paths.

A simple method control results when the tools are provided in a punch press. In this case, the lamination packs can be processed immediately after their assembly in a punch press with the tool.

The tools can also be provided inside a stacking device in which the laminations are stacked to the lamination pack.

The device according to the invention is characterized in that the at least one welding tool is driven in rotation about its axis and, during processing, is movable transverse to this axis of rotation. During its advancing movement, the tool is thus driven in rotation about its axis so that the high friction heat required for plastification of the lamination material is generated in the laminations.

In a simple embodiment, the tool is provided with an exterior head that can be rotatably driven about its axis. For rotation of the exterior head, for example, a gear drive or a belt drive can be provided.

In the exterior head, advantageously a center head is provided which is fixedly or also freely rotatably connected to the exterior head. In this way, the center head is entrained by the rotating exterior head.

In an advantageous embodiment, the center head is adjustable in axial direction of the exterior head relative to the exterior head and preferably rotatable. In a preferred embodiment, this adjustment is achieved by means of a spindle drive by means of which the center head can be adjusted relative to the exterior head.

A compact configuration of the tool results when the exterior head and the center head are coaxially positioned relative to each other.

The subject matter of the application results not only from the subject matter of the individual claims but also from all specifications and features disclosed in the drawings and the description. They are claimed as important to the invention, even if they are not subject matter of the claims, insofar as, individually or in combination, they are novel relative to the prior art.

Further features of the invention result from the additional claims, the description, and the drawings.

BRIEF DESCRIPTION OF THE DRAWINGS

The invention will be explained in more detail with the aid of the embodiment that is illustrated in the drawings. It is shown in:

FIG. 1 in schematic illustration and in side view a device according to the invention for punching laminations for forming a lamination pack;

FIG. 2 in an illustration corresponding to FIG. 1 the device according to the invention with friction stir welding devices;

FIG. 3 in schematic illustration a two-head friction stir tool in side view;

FIG. 4 a plan view of the friction stir tool according to FIG. 3;

FIG. 5 in schematic illustration a plan view of two friction stir tools engaging the lamination pack;

FIG. 6 the friction stir tools and the lamination pack according to FIG. 5 in side view;

FIG. 7 a plan view of a lamination pack whose laminations have been connected to each other by friction stir welding;

FIG. 8 the lamination pack according to FIG. 7 in side view.

DESCRIPTION OF PREFERRED EMBODIMENTS

With the device according to FIGS. 1 and 2, laminations 2 (FIG. 8) are cut from a metal strip (electric strip) 1 or an electric sheet in a known way and are stacked to a lamination pack 3. The lamination pack 3 is used for producing rotors or stators of electric motors, but also generators.

The metal strip 1 is coiled on a coiler 4 which is rotatable about its axis. The metal strip 1 that is decoiled from the coiler 4 is passed through a straightening apparatus 5 by means of which the metal strip 1 is straightened for the subsequent punching process. The metal strip 1 downstream of the straightening apparatus 5 reaches a punch press 6 in which the laminations 2 are punched from the metal strip 1.

Also, two or more strips 1 can be guided adjacent to each other into the punch press 6 so that the laminations 2 can be punched simultaneously from the individual metal strips 1. Further, it is possible to punch the laminations in the metal strip 1 not just in one track but also, for example, in two tracks.

The punch press 6 is provided with one or a plurality of corresponding punching tools 7. The laminations 2 which are punched by them reach a chamber 8 into which the laminations 2 are pushed immediately after punching. The chamber 8 forms a receptacle and, as is known in the art, is designed such that the laminations 2 with their edge are contacting with friction the inner wall of the chamber 8 so that they cannot fall out of the chamber 8. In this way, the punched laminations 2 are placed onto each other to a stack in the chamber 8. For each punching stroke, the respectively punched lamination is pushed downwardly onto the laminations that are already located in the chamber. A plunger (not illustrated) on which the laminations 2 are stacked to the lamination pack 3 is projecting into the chamber 8. With each punching stroke, this plunger is moved step-by-step in downward direction so that the respectively punched lamination 2 can be moved downwardly into the chamber 8 so far that the subsequent lamination 2 to be punched can be pushed reliably into the chamber 8.

In case of a plurality of metal strips 1 passing simultaneously through the punch press 6, it is advantageous when each metal strip 1 has correlated therewith one chamber 8 so that in the punch press 6 simultaneously a plurality of lamination packs can be stacked adjacent to each other. There is however also the possibility of providing in the punch press 6 only one chamber 8 into which the laminations, punched from different metal strips 1, are conveyed by means of a transport device, for example, a rotary device, into the region above the chamber 8 and then are pushed into the chamber 8. Such a transport device is in particular advantageous when the laminations 2 are punched from a metal strip 1 in adjacently positioned tracks. It is then possible to transport the adjacently positioned laminations 2 with such a transport unit into the only chamber 8.

So that the lamination stack 3 can be processed further after removal from the punch press 6, the laminations 2 which are resting on each other in the lamination pack 3 are connected fixedly to each other. For this purpose, the laminations 2 lying on top of each other are connected to each other transverse to their plane by a plastification method in that the laminations 2 at the edge are partially plasticized such that laminations 2 lying on top of each other are materially fused and fixedly connected to each other after cooling of this material.

For this purpose, the punch press 6 is provided with at least one friction stir welding device 9 that advantageously is arranged in the region of a stacking device of the punch press 9. At the rim of the sheet metal pack 3, a weld seam 10 (FIGS. 7 and 8) is provided that extends across the height of the lamination pack 3. Depending on the size of the lamination pack 3, a single weld seam 10 may be sufficient. In the embodiment, two diametrically opposed weld seams 10 are provided on the lamination pack 3. Depending on the size of the lamination pack 3, additional weld seams can be provided with which the laminations 2 are held together within the lamination pack 3.

When two or a more weld seams 10 are applied to the lamination pack 3, in principle one friction stir welding device 9 that is arranged to be adjustable about the circumference of the lamination pack 3 is sufficient for this purpose. A faster process results however when one friction stir welding device 9 is provided, respectively, for each weld seam 10 to be applied to the lamination pack 3.

The friction stir welding device 9 comprises a tool 9' with a cylindrical exterior head 11 (FIG. 3) in which a center head 12 is accommodated. The exterior head 11 is driven about its axis in rotation by means of a gear drive or belt drive. By means of a spindle drive, the center head 12 can be precisely adjusted axially relative to the exterior head 11. When the exterior head 11 is rotatably driven about its axis, the center head 12 is accordingly entrained in rotation. At the transition between the center head 12 and the exterior head 11 a radial annular shoulder 13 is formed.

The tool 9' is moved radially against the lamination pack 3 until its end face 14 contacts the outer wall 15 of the lamination pack. The tool 9' is forced at great axial force against the lamination pack 3 whereby it is driven in rotation about its axis. By means of the friction between the flat end face 14 of the tool 9' and the lamination pack 3, the material underneath the end face 14 is heated to just below the melting point of the material of the lamination pack 3. Due to this high temperature, the material of the lamination pack 3 is plasticized. The rotating tool 9' is now moved in height direction of the lamination pack 3 wherein the great axial force and the rotary speed are maintained. Due to the plasticized material in the region of the tool 9', mixing of the material of the laminations 3 lying on top of each other occurs with advancing movement of the tool. The material mixing is realized in that the tool 9' carries out the advancing movement with simultaneous rotary movement. The advancing speed is selected such that in the region of the tool 9' the material of the laminations 2 lying on top of each other becomes soft. Due to the rotary movement, the materials of the laminations 2 lying on top of each other mix so that, after cooling of the plasticized material, the laminations 2 within the lamination pack 3 are connected to each other by material fusion.

The tool 9' is advantageously moved in axial direction along the lamination pack 3 so that the weld seam 10 at the outer wall of the lamination pack 3 extends in axial direction. The tool 9' can be moved, in principle, in different directions along the lamination pack 3 so that the weld seam 10 has a different course. For example, the weld seam 10 can extend at a slant to the axial direction of the lamination pack 3, perpendicular to the axis of the lamination pack 3. Also, the weld seam 10 can have differently slanted course by appropriate movement of the tool 9' in the height direction of the lamination pack 3. The weld seam 10 is provided on the outer wall 15 of the lamination pack 3 such that the laminations 2 are reliably connected to each other.

In the embodiment, for connecting the laminations 2 in the lamination pack 3, two diametrically opposed tools are employed. In this case, on the outer wall 15 of the lamination pack 3 two weld seams 10 that are positioned opposite each other are formed. The two tools 9' are advantageously controlled independent of each other so that also different courses of the weld seams 10 can be generated.

Often, metal strips are employed which are comprised of silicon-aluminum alloys. In case of such metal strips, it is often desired to select the silicon proportion as high as possible. Rotors and/or stators whose lamination packs have been manufactured of such a metal strip have, due to the higher silicon proportion, minimal magnetic losses which leads to greater power of the electric motor. With the described method, laminations of such materials can be connected with each other by material fusion without problem. The silicon proportions in such silicon-aluminum alloys can contain more than approximately 4% by weight of silicon without this having negative effects on the material-fused connection of the laminations 2 with each other. With the tool 9' the material of the laminations is plasticized wherein, by the rotary movement of the tool 9' during its advancing movement, the plasticized material of neighboring laminations 2 will be mixed with each other so that the reliable cohesion of the laminations 2 after cooling of the plasticized material is ensured.

The weld seams 10 have only a minimal depth so that they have no disadvantageous effects on the lamination pack 3 or the properties of the electric motor containing this lamination pack. The weld seam depth is selected such that a reliable connection of the laminations 2 with each other is provided. The described method can be performed in a simple, reliable way and within a very short period of time. The lamination packs 3 produced in this way can be manipulated and transported without problem, without there being the risk that laminations 2 within the lamination pack 3 become detached.

It is further possible to arrange the tool 9' stationarily and to rotate it during the welding process about its axis. In this case, the lamination pack 3 is moved in its height direction relative to the stationary tool 9' and is forced in this context with such a great force against the tool 9' that the material of the laminations 2 within the lamination pack 3 is plasticized in the described manner in the contact region.

What is claimed is:

1. A method for producing a lamination pack, the method comprising:
punching in a punch press laminations from an electric strip or electric sheet;
stacking the laminations on top of each other to form a lamination stack so that the laminations contact each other directly in the lamination stack;
locally plasticizing a material of the laminations in an edge region of the laminations by:
moving at least one tool across the lamination stack in a direction of height of the lamination stack, the at least one tool comprising a cylindrical exterior head and further comprising a center head, wherein the center head is arranged inside the cylindrical exterior head, is axially adjustable in an axial direction of the at least one tool relative to the cylindrical exterior head to form a common flat end face, and is connected to the cylindrical exterior head for common rotation therewith; driving the cylindrical exterior head in rotation together with the center head to rotate the common flat end face; and axially forcing the rotating common flat end face in the axial direction of the at least one tool against the lamination stack in a contact region of the lamination stack with such a force that the material of the laminations is heated to just below the melting point of the material of the laminations and is plasticized in the contact region; or moving the lamination stack in a direction of height of the lamination stack relative to at least one tool that is arranged stationarily, the at least one tool comprising a cylindrical exterior head and further comprising a center head, wherein the center head is arranged inside the cylindrical exterior head, is axially adjustable in an axial direction of the at least one tool relative to the cylindrical exterior head to form a common flat end face, and is connected to the cylindrical exterior head for common rotation therewith; driving the cylindrical exterior head in rotation together with the center head to rotate the common flat end face; and forcing a contact region of the lamination stack against the rotating common flat end face in the axial direction of the at least one tool with such a force that the material of the laminations is heated in the contact region to just below the melting point of the material of the laminations and is plasticized in the contact region;

mixing the locally plasticized material, at least of the laminations that are neighboring each other, with the at least one tool; and allowing the plasticized material to cool and fuse the laminations by material fusion to each other in the edge region by a weld seam extending across the height of the lamination stack to fixedly connect the laminations to each other in the edge region to form the lamination pack.

2. The method according to claim 1, further comprising moving the at least one tool in an axial direction of the lamination stack.

3. The method according to claim 1, further comprising employing two or more of the at least one tool.

4. The method according to claim 3, further comprising processing the lamination stack simultaneously with the two or more tools.

5. The method according to claim 3, further comprising driving the two or more tools independent of each other.

6. The method according to claim 1, further comprising arranging the at least one tool in a stacking device of the punch press in which the laminations are stacked.

7. A method for producing a lamination pack, the method comprising:

punching in a punch press laminations from an electric strip or electric sheet comprised of a silicon-aluminum alloy containing more than 4 percent by weight of silicon;

stacking the laminations on top of each other to form a lamination stack so that the laminations contact each other directly in the lamination stack;

locally plasticizing a material of the laminations in an edge region of the laminations by:

moving at least one tool across the lamination stack in a direction of height of the lamination stack; driving the at least one tool in rotation; and axially forcing the at least one tool, driven in rotation, in a contact region of the lamination stack against the lamination stack with such a force that the material of the laminations is plasticized in the contact region; or moving the lamination stack in a direction of height of the lamination stack across at least one tool arranged stationarily; driving the at least one tool in rotation; and forcing a contact region of the lamination stack against the at least one tool, driven in rotation, with such a force that the material of the laminations is plasticized in the contact region;

mixing the locally plasticized material, at least of the laminations that are neighboring each other, with the at least one tool; and allowing the plasticized material to cool and fuse the laminations by material fusion to each other in the edge region by a weld seam extending across the height of the lamination stack to fixedly connect the laminations to each other in the edge region to form the lamination pack.

8. The method according to claim 7, further comprising arranging the at least one tool in a stacking device of the punch press in which the laminations are stacked.

* * * * *